N. S. GILBERT.
Fruit Can.

No. 31,235.

Patented Jan. 29, 1861.

UNITED STATES PATENT OFFICE.

N. S. GILBERT, OF LOCKPORT, NEW YORK.

IMPROVEMENT IN PRESERVE-CANS.

Specification forming part of Letters Patent No. 31,235, dated January 29, 1861.

*To all whom it may concern:*

Be it known that I, N. S. GILBERT, of Lockport, in the county of Niagara and State of New York, have invented certain new and useful Improvements in Fruit or Preserving Cans; and I do hereby declare that the following is a full, clear, and exact description of the same, reference being had to the accompanying drawings, and to the letters of reference marked thereon, in which—

Figure 1:
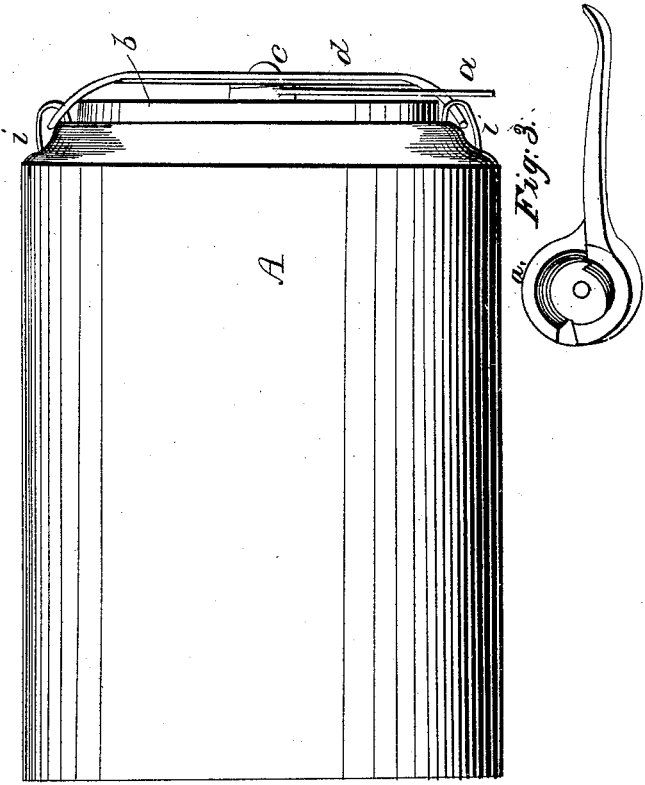
Figure 2:
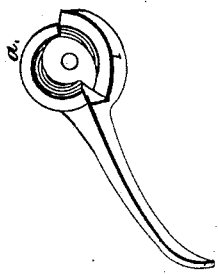

Figure 1 is a vertical section; Figs. 2 and 3, perspectives of the lever, showing its peculiar mode of construction.

The nature of my invention consists in the employment of the cam-lever for the purpose of giving pressure to the top of the can, thereby excluding the air, also in the combination of the same with such other devices as will be hereinafter particularly set forth.

To enable others skilled in the art to make and use my invention, I will proceed to describe its construction and operation.

A represents the jar or can, provided with ears $i\ i$. Around the mouth of the can is a recess, in which is placed an india-rubber ring. Said ring may be secured in its place by first pouring melted resin or any other such material in the recess, and then laying the ring down. This will also suffice more effectually to prevent air from getting in the can. There is an inside tin lid or cover with its edge turned down, so that when placed over the mouth of the can its edges will come in contact with the india-rubber ring.

$b$ represents a cast-iron cover, with its edge turned down in the same manner as the one just described.

$a$ represent a lever constructed with two inclined planes upon its upper side. These inclined planes should be directly reversed, as shown in Figs. 1 and 2. The opposite side of said lever should be flat.

$d$ represents a bale, with its ends turned at right angles and in opposite directions.

$c$ is a pin with a head to it. Said pin confines lever $a$ between the cover $b$ and bale $d$, as fully shown in Fig. 1.

The operation of my invention is as follows: After the fruit has been prepared and put in the can, you then place the can in hot water, which expels the air. The inside top is then put in its proper place and the cover $b$ put over it. The ends of the bale are then adjusted, as shown in Fig. 1, and the lever turned, which at once sinks the edges of the two covers into the india-rubber ring, and effectually prevents the air from again entering the can.

Having thus fully described my invention, what I claim, and desire to secure by Letters Patent, is—

1. The employment of the cam-lever $a$, as constructed, when used substantially as and for the purpose set forth.

2. The combination of loop or bale $d$, cover $b$, pin $c$, and cam-lever $a$, the whole being arranged and operated in the manner and for the purpose specified.

N. S. GILBERT.

Witnesses:
D. DONNELLY,
J. N. HAMILTON.